US008170280B2

(12) United States Patent
Zhao et al.

(10) Patent No.: US 8,170,280 B2
(45) Date of Patent: May 1, 2012

(54) INTEGRATED SYSTEMS AND METHODS FOR VIDEO-BASED OBJECT MODELING, RECOGNITION, AND TRACKING

(75) Inventors: Liang Zhao, Morrisville, NC (US); Matthew G. Berry, Raleigh, NC (US)

(73) Assignee: Digital Smiths, Inc., Durham, NC (US)

( * ) Notice: Subject to any disclaimer, the term of this patent is extended or adjusted under 35 U.S.C. 154(b) by 818 days.

(21) Appl. No.: 12/327,589

(22) Filed: Dec. 3, 2008

(65) Prior Publication Data

US 2009/0141940 A1 Jun. 4, 2009

Related U.S. Application Data

(60) Provisional application No. 60/991,879, filed on Dec. 3, 2007.

(51) Int. Cl.
*G06K 9/00* (2006.01)
*G06F 3/00* (2006.01)
(52) U.S. Cl. .......................... 382/103; 382/291; 715/723
(58) Field of Classification Search .................. 382/100, 382/103, 106, 107, 155, 162, 168, 173, 181, 382/190, 209, 219, 232, 254, 274, 276, 291, 382/305, 312; 1/1; 345/619; 707/802; 715/723
See application file for complete search history.

(56) References Cited

U.S. PATENT DOCUMENTS

| | | | |
|---|---|---|---|
| 5,267,351 A * | 11/1993 | Reber et al. ........................... 1/1 |
| 5,537,528 A | 7/1996 | Takahashi et al. |
| 5,630,121 A | 5/1997 | Braden-Harder et al. |
| 5,650,941 A * | 7/1997 | Coelho et al. ................. 345/619 |
| 5,655,117 A | 8/1997 | Goldberg et al. |
| 5,832,495 A | 11/1998 | Gustman |
| 5,903,892 A | 5/1999 | Hoffert et al. |
| 5,956,729 A * | 9/1999 | Goetz et al. .................... 707/802 |
| 6,032,156 A | 2/2000 | Marcus |
| 6,134,380 A | 10/2000 | Kushizaki |
| 6,154,601 A | 11/2000 | Yaegashi et al. |
| 6,172,675 B1 | 1/2001 | Ahmad et al. |
| 6,192,183 B1 | 2/2001 | Taniguchi et al. |
| 6,195,458 B1 | 2/2001 | Warnick et al. |
| 6,249,280 B1 | 6/2001 | Garmon et al. |
| 6,285,361 B1 | 9/2001 | Brewer et al. |

(Continued)

OTHER PUBLICATIONS

Sen-Ching S. Cheung and Avideh Zakhor, Efficient Video Similarity Measurement with Video Signature, Department of Electrical Engineering and Computer Sciences, University of California, Berkeley, CA, 94720, USA, pp. 1-33.

(Continued)

*Primary Examiner* — Seyed Azarian
(74) *Attorney, Agent, or Firm* — Todd Partners, P.C.

(57) ABSTRACT

The present disclosure relates to systems and methods for modeling, recognizing, and tracking object images in video files. In one embodiment, a video file, which includes a plurality of frames, is received. An image of an object is extracted from a particular frame in the video file, and a subsequent image is also extracted from a subsequent frame. A similarity value is then calculated between the extracted images from the particular frame and subsequent frame. If the calculated similarity value exceeds a predetermined similarity threshold, the extracted object images are assigned to an object group. The object group is used to generate an object model associated with images in the group, wherein the model is comprised of image features extracted from optimal object images in the object group. Optimal images from the group are also used for comparison to other object models for purposes of identifying images.

31 Claims, 15 Drawing Sheets

U.S. PATENT DOCUMENTS

| | | | |
|---|---|---|---|
| 6,292,620 B1 | 9/2001 | Ohmori et al. | |
| 6,327,420 B1 | 12/2001 | Furukawa | |
| 6,330,004 B1 * | 12/2001 | Matsuzawa et al. | 715/723 |
| 6,895,407 B2 | 5/2005 | Romer et al. | |
| 7,613,321 B2 * | 11/2009 | Altherr et al. | 382/103 |
| 8,073,197 B2 * | 12/2011 | Xu et al. | 382/103 |
| 2002/0089646 A1 | 7/2002 | Chang | |
| 2002/0108112 A1 | 8/2002 | Wallace et al. | |
| 2004/0019524 A1 | 1/2004 | Marshall | |

OTHER PUBLICATIONS

X. Hua, X. Chen and H. Zhang, "Robust Video Signature Based on Ordinal Measure," Microsoft Research Asia, Beijing 100080, China, pp. 1-4.

A. Bosch, X. Munoz, R. Marti, "A Review: Which is the best way to organize/classify images by content?" Image Vision Computing 2006.

A. Bosch, A Zisserman, X. Munoz, "Scene Classification Via pLSA," Computer Vision and Robotics Group, Girona.

A. Bosch, A Zisserman, X. Munoz, "Scene Classification Using a Hybrid Generative/Discriminative Approach," IEEE Transactions on Pattern Analysis and Machine Intelligence, vol. 30, No. 4, Apr. 2008, pp. 1-37-40.

M. Boutell, J. Luo, C. Brown, "Factor-graphs for Region-base Whole-scene Classification," Proceedings of the 2006 Conf. on Computer Vision and Pattern Recognition Workshop, IEEE Computer Society, 2006.

M. Boutell, J. Luo, R.T. Gray, "Sunset Scene Classification Using Simulated Image Recomposition," Proceedings of the 2003 Int'l Conf. on Multimedia and Expo, IEEE Computer Society, 2003, pp. 37-40.

Y. Chen, J.Z. Wang, "Image Categorization by Learning and Reasoning with Regions," Journal of Machine Learning Research, 2004, vol. 5, pp. 913-939.

L. Fei-Fei, P. Perona, "A Bayesian Hierarchical Model for Learning Natural Scene Categories," Proceedings of the 2005 IEEE Computer Society Conference on Computer Vision and Pattern Recognition, IEEE Computer Society, 2005, pp. 524-531.

P. Felzenszwalb, D. Huttenlocher, "Efficient Graph-Based Image Segmentation," International Journal of Computer Vision, Sep. 2004, vol. 59, Issue 2, Kluwer Academic Publishers, pp. 167-181.

J. Fox, R. Castano, R. Anderson, "Onboard Autonomous Rock Shape Analysis for Mars Rovers," IEEE Aerospace Conference Proceedings, Paper #276, Mar. 2002.

G. Heidemann, "Unsupervised Image Categorization," Image Vision Computing 23, 2005, pp. 861-876.

D. Hoiem, A. Efros, M. Hebert, "Geometric Context from a Single Image," International Conference of Computer Vision (ICCV), IEEE, Oct. 2005, pp. 1-8.

M. Israel, E. Van Den Broek, P. Van Der Putten, "Automating the Construction of Scene Classifiers for Content-Based Video Retrieval," MDM/DKK'04, Aug. 22, 2004, Seattle, WA, USA.

J. Kivinen, E. Sudderth, M. Jordan, "Learning Multiscale Representations of Natural Scenes Using Dirichlet Processes," IEEE 11th International Conference on Computer Vision, 2007.

S. Lazebnik, C. Schmid, J. Ponce, "Beyond Bags of Features: Spatial Pyramid Matching for Recognizing Natural Scene Categories," Computer Vision and Pattern Recognition, 2006 IEEE Computer Science Society Conference, vol. 2, 2006, pp. 2169-2178.

L. Lepisto, I. Kunttu, J. Autio, A. Visa, "Comparison of Some Content-Based Image Retrieval Systems with Rock Texture Images," Proceedings of 10th Finnish AI Conference, Dec. 2002.

T. Leung, J. Malik, "Representing and Recognizing the Visual Appearance of Materials Using Three Dimensional Textons," International Journal of Computer Vision, 43, 2001, pp. 29-44.

J. Li, J. Wang, "Automatic Linguistic Indexing of Pictures by a Statistical Modeling Approach," IEEE Transactions on Pattern Analysis and Machine Intelligence, vol. 25, No. 9, Sep. 2003.

V. Milkli, H. Kaerdi, P. Kulu, M. Besterci, "Characterization of Powder Particle Morphology," Proceedings of Estonian Acad. of Sci. Eng. vol. 7, 2001, pp. 22-34.

G. Mori, X. Ren, A. Efros, J. Malik, "Recovering Human Body Configurations: Combining Segmentation and Recognition," IEEE CS Conf. Computer Vision and Pattern Recognition, 2004.

M. Partio, B. Cramariuc, M. Gabbouj, A. Visa, "Rock Texture Retrieval Using Gray Level Co-Occurrence Matrix," 5th Nordic Signal Processing Symposium, Oct. 2002.

M. Peura, J. Iivarinen, "Efficiency of Simple Shape Descriptors," Proceedings of the Third International Workshop on Visual Form, Capri, Italy, May 1997, pp. 1-9.

P. Quelhas, J. Odobez, "Natural Scene Image Modeling Using Color and Texture Visterms," Lecture Notes in Computer Science, Springer Berlin/Heidelberg, vol. 4017, Jun. 30, 2006, pp. 411-421.

N. Serrano, A. Savakis, J.. Luo, "A Computationally Efficient Approach to Indoor/Outdoor Scene Classification," Proceedings of 16th International Conference on Pattern Recognition, 2002, vol. 4, p. 40146.

J. Shotton, M. Johnson, R. Cipolla, "Semantic Texton Forests for Image Categorization and Segmentation," IEEE Computer Vision and Pattern Recognition, 2008, pp. 1-8.

A. Torralba, A. Olivia, "Statistics of Natural Image Categories," Network: Computation in Neural Systems, Institute of Physics Publishing, 2003, vol. 14, pp. 391-412.

A. Vailaya, A. Jain, H.J. Zhang, "On Image Classification: City Images vs. Landscapes," Content-Based Access of Image and Video Libraries, 1998, Proceedings, IEEE Workshop, Jun. 21, 1998, pp. 1-23.

M. Varma, A. Zisserman, "A Statistical Approach to Texture Classification from Single Images," Kluwer Academic Publishers, 2004, Netherlands.

J. Vogel, B. Schiele, "Natural Scene Retrieval based on Semantic Modeling Step," International Conference on Image and Video Retrieval CIVR 2004, Jul. 2004, Dublin, Ireland.

B.C. Russell, A. Torralba, K. Murphy, and W. Freeman, "LabelMe: A database and web-based tool for image annotation," International Journal of Computer Vision, vol. 77, Issue 1-3, May 2008, pp. 157-173.

Z. Rasheed, M. Shah, "Scene Detection in Hollywood Movies and TV Shows," IEEE Computer Society Conference on Computer Vision and Pattern Recognition, vol. 2, Feb. 27, 2003, pp. 1-8.

C.C. Gotlieb, H.E. Kreyszig, "Texture descriptors based on co-occurrence matrices." Computer Vision, Graphics and Image Processing, Computer Vision, Graphics and Image Processing, 51: 1990, pp. 76-80.

J. Luo, A. Savakis, "Indoor vs Outdoor Classification of Consumer Photographs Using Low-Level and Semantic Features," Image Processing, 2001 International Conference, Oct. 2001, vol. 2, 745-748.

* cited by examiner

OVERALL PROCESS

OBJECT MODELING

OBJECT RECOGNITION

OBJECT TRACKING

| Episode ID | Episode Title | Number of Frames |
|---|---|---|
| ep00 | Pilot | 32044 |
| ep01 | The Lorelais' First Day At Chilton | 31310 |
| ep02 | Kill Me Now | 31862 |
| ep03 | The Deer Hunters | 32234 |
| ep04 | Cinnamon's Wake | 31174 |
| ep06 | Kiss and Tell | 32246 |

FIG. 6

TESTED EPISODE LISTING

| Episode ID | Number of Detected Facial Images | Number of Face Groups |
|---|---|---|
| ep00 | 19092 | 117 |
| ep01 | 17004 | 101 |
| ep02 | 18414 | 92 |
| ep03 | 18197 | 128 |
| ep04 | 18233 | 132 |
| ep06 | 21483 | 150 |

FIG. 7

DETECTED IMAGES AND GROUPS

PRECISION-RECALL CURVE OF FACIAL RECOGNITION USING PURE MODELS GENERATED FROM EACH EPISODE ALONE

| Episode ID | Precision | Recall | Precision | Recall |
|---|---|---|---|---|
| ep00 | 100% | 17.3% | 90% | 25.3% |
| ep01 | | 5.7% | | 8% |
| ep02 | | 17.7% | | 19.4% |
| ep03 | | 14% | | 14.7% |
| ep04 | | 21.1% | | 44.2% |

FIG. 9

PRECISION-RECALL PERCENTAGES FOR PURE MODELS

| Character / Model ID | Precision | Recall |
|---|---|---|
| 1 | 0.0% | 0.0% |
| 2 | 81% | 32.1% |
| 3 | 100% | 11.1% |
| 4 | 0.0% | 0.0% |
| 5 | 0.0% | 0.0% |
| 6 | 0.0% | 0.0% |
| 7 | 97.9% | 79.7% |
| 8 | 0.0% | 0.0% |

FIG. 10

AVERAGE PRECISION AND RECALL VALUES FOR PURE MODELS FOR EIGHT MAJOR CHARACTERS OF EP04

| ID | 0 | 1 | 2 | 3 | 4 | 5 | 6 | 7 | 8 |
|---|---|---|---|---|---|---|---|---|---|
| 0 | 2 | 0 | 0 | 0 | 0 | 0 | 0 | 1 | 0 |
| 1 | 0 | 0 | 0 | 0 | 0 | 0 | 0 | 0 | 0 |
| 2 | 32 | 0 | 17 | 0 | 0 | 0 | 0 | 4 | 0 |
| 3 | 8 | 0 | 0 | 1 | 0 | 0 | 0 | 0 | 0 |
| 4 | 2 | 0 | 0 | 0 | 1 | 0 | 0 | 0 | 0 |
| 5 | 4 | 0 | 0 | 0 | 0 | 0 | 0 | 0 | 0 |
| 6 | 18 | 0 | 0 | 0 | 0 | 0 | 0 | 0 | 1 |
| 7 | 11 | 0 | 1 | 0 | 0 | 0 | 0 | 47 | 0 |
| 8 | 1 | 0 | 0 | 0 | 0 | 0 | 0 | 0 | 0 |

FIG. 11

CONFUSION MATRIX FOR PURE MODELS FOR EIGHT MAJOR CHARACTERS IN EP04

PRECISION-RECALL CURVE OF FACIAL RECOGNITION USING MERGED MODELS GENERATED FROM INCREMENTALLY-COMBINED EPISODES

| Episode | Precision | Recall | Precision | Recall |
|---|---|---|---|---|
| ep00-01 | 100% | 10.7% | 90% | 31.3% |
| ep00-02 | | 10.7% | | 38.9% |
| ep00-03 | | 11.3% | | 42% |
| ep00-04 | | 11.3% | | 42.7% |

FIG. 13

PRECISION-RECALL PERCENTAGES FOR MERGED MODELS

| Character / Model ID | Precision | Recall |
|---|---|---|
| 1 | 0.0% | 0.0% |
| 2 | 90% | 34% |
| 3 | 100% | 11.1% |
| 4 | 0.0% | 0.0% |
| 5 | 0.0% | 0.0% |
| 6 | 0.0% | 0.0% |
| 7 | 0.0% | 0.0% |
| 8 | 0.0% | 0.0% |
| 9 | 0.0% | 0.0% |
| 10 | 0.0% | 0.0% |
| 11 | 97.8% | 76.3% |
| 12 | 0.0% | 0.0% |

FIG. 14

AVERAGE PRECISION AND RECALL VALUES FOR MERGED MODELS FOR TWELVE MAJOR CHARACTERS OF ALL COMBINED EPISODES

| ID | 0 | 1 | 2 | 3 | 4 | 5 | 6 | 7 | 8 | 9 | 10 | 11 | 12 |
|----|---|---|---|---|---|---|---|---|---|---|----|----|----|
| 0  | 0 | 0 | 0 | 0 | 0 | 0 | 0 | 0 | 0 | 0 | 0  | 0  | 0  |
| 1  | 0 | 0 | 0 | 0 | 0 | 0 | 0 | 0 | 0 | 0 | 0  | 0  | 0  |
| 2  | 33| 0 | 18| 0 | 0 | 0 | 0 | 0 | 0 | 0 | 0  | 2  | 0  |
| 3  | 8 | 0 | 0 | 1 | 0 | 0 | 0 | 0 | 0 | 0 | 0  | 0  | 0  |
| 4  | 0 | 0 | 0 | 0 | 0 | 0 | 0 | 0 | 0 | 0 | 0  | 0  | 0  |
| 5  | 2 | 0 | 0 | 0 | 0 | 0 | 0 | 0 | 0 | 0 | 0  | 1  | 1  |
| 6  | 1 | 0 | 0 | 0 | 0 | 0 | 0 | 0 | 0 | 0 | 0  | 1  | 0  |
| 7  | 4 | 0 | 0 | 0 | 0 | 0 | 0 | 0 | 0 | 0 | 0  | 0  | 0  |
| 8  | 0 | 0 | 0 | 0 | 0 | 0 | 0 | 0 | 0 | 0 | 0  | 2  | 0  |
| 9  | 17| 0 | 0 | 0 | 0 | 0 | 0 | 0 | 0 | 0 | 0  | 0  | 0  |
| 10 | 0 | 0 | 0 | 0 | 0 | 0 | 0 | 0 | 0 | 0 | 0  | 45 | 0  |
| 11 | 13| 0 | 0 | 0 | 0 | 0 | 0 | 0 | 0 | 0 | 0  | 0  | 0  |
| 12 | 1 | 0 | 0 | 0 | 0 | 0 | 0 | 0 | 0 | 0 | 0  | 0  | 0  |

FIG. 15

CONFUSION MATRIX FOR MERGED MODELS FOR TWELVE MAJOR CHARACTERS IN ALL EPISODES

INTEGRATED SYSTEMS AND METHODS FOR VIDEO-BASED OBJECT MODELING, RECOGNITION, AND TRACKING

CROSS REFERENCE TO RELATED APPLICATION

This application claims benefit under 35 U.S.C. §119(e) of U.S. Provisional Patent Application No. 60/991,879, filed Dec. 3, 2007, and entitled "Integrated Systems for Face Recognition, Tracking, and Modeling", which is incorporated herein by reference as if set forth herein in its entirety.

TECHNICAL FIELD

The present systems and methods relate generally to video-based object modeling, recognition, and tracking, and more particularly to detection, modeling, recognition, and tracking of objects within videos for purposes of indexing and retrieving those videos or portions of videos, wherein generated global object models are insensitive to variations in pose and location of the objects within the videos, as well as the resolution of the videos and other factors.

BACKGROUND

Recognition of objects within videos plays an important role for many video-related purposes, such as indexing and retrieval of videos based on identified objects, security and surveillance, and other similar functions. As used herein, the term "object" shall refer to a definable image within a video, such as a face, automobile, article of clothing, or virtually any other type of object. For example, FIG. 1 illustrates a sample frame of a video scene. Exemplary objects that are capable of being recognized within the illustrated video include characters' faces, a plant in a vase, a shoe, and an automobile tire, each of which is shown within a dashed box to indicate its detection and recognition within the frame. As will be understood, however, virtually any image may be detected and recognized within a given video.

Many object recognition systems, and particularly facial recognition systems, are known in the art, such as those described in R. Gross et. al, *Face Recognition Across Pose and Illumination*, Handbook of Face Recognition, Springer-Verlag (2004), and W. Zhao et. al, *Face Recognition: A Literature Survey*, ACM Computing Surveys (2003), and in other similar texts. A typical face recognition system includes three general stages: face data collection, facial modeling, and facial identification using the learned/generated models. Traditional photo-based face recognition technologies, such as those described in M. Turk and A. Pentland, *Face Recognition Using Eigenfaces*, IEEE Conference on Computer Vision and Pattern Recognition, pp. 586-91 (1991), utilize a single image or a set of images or photos to generate a model or models. These systems function properly only when the underlying photos, which are used for analysis and generation of facial models, are taken in controlled environments, such as with uniform or fixed lighting conditions. Further, the faces in the photos generally must be frontal poses only, and include little or no expression. Because these traditional systems are constrained in their ability to adapt to variations in photos, and because they only provide fixed-face models, their applications, especially for videos (as opposed to still images), are highly limited.

Recently, in order to overcome the limitations of traditional photo-based technologies, some video-based facial recognition systems have emerged, such as those described in M. Kim et. al., *Face Tracking and Recognition with Visual Constraints in Real-World Videos*, IEEE Conference on Computer Vision and Pattern Recognition (2008), and Krueger and Zhou, *Exemplar-Based Face Recognition from Video*, European Conference on Computer Vision, pp. 732-46 (2002), and in other similar texts. These proposed systems attempt to overcome the recognition and modeling problems posed by images with variations in lighting, background, and character pose, as well as continuous camera motion or character movement within a video scene. These systems generally function by either treating each frame within a video as an independent image (essentially just a variation of a traditional photo-based system) and generating a plurality of facial models corresponding to each image, or they look at all images in the sequence as a whole and weight each image in the sequence equally to generate a combination model of all equally-weighted images.

Both types of video-based recognition systems, however, are cumbersome and inefficient, and they produce facial models that are often inaccurate. Particularly, by analyzing all images in a video, the resulting model or models are naturally generated using some images that are partially occluded, have low resolutions, include non-frontal poses, contain poor lighting, and have a host of other issues, resulting in poor quality models. Accordingly, recognition systems that incorporate models generated by conventional video-based systems often produce low recognition rates and overall poor results.

The ability to effectively and efficiently index, store, and retrieve videos, or portions of videos, based on objects in those videos is important for a variety of fields. For example, production companies or advertisement agencies often rely on old or previously-created movies, television shows, and other video clips for inclusion in new advertisements, promotions, trailers, and the like. Additionally, with the continuing advances of technology, online video viewing is becoming increasingly popular, and thus the capability to locate, retrieve, and present videos or clips based on user-entered search criteria is becoming progressively more vital. Further, security systems can benefit from accurate and consistent identification of perpetrators or victims within surveillance videos. However, existing and conventional object and facial recognition systems are neither flexible nor accurate enough for these and other commercial applications.

For these and many other reasons, there is a long-felt but unresolved need for a system or method that is able to generate effective object models for object recognition based on video data, and track temporal coherence of videos in order to dynamically update and optimize the generated models.

BRIEF SUMMARY OF THE DISCLOSURE

Briefly described, and according to one embodiment, the present disclosure is directed to a method for tracking object images in video files. The method comprises the steps of receiving a video file, wherein the video file comprises a plurality of frames; extracting an image of an object from a particular frame in the video file; and extracting a subsequent image of an object from a subsequent frame in the video file. Next, a similarity value is calculated between the extracted object image from the particular frame and the subsequent extracted object image in the subsequent frame. If the calculated similarity value exceeds a predetermined similarity threshold, then the extracted object images from the video file are collected or organized into an object group.

According to one aspect, the method further comprises the steps of identifying one or more optimal object images from the images in the object group; extracting a plurality of object features from the one or more optimal object images, wherein the object features comprise image data associated with the one or more optimal object images; and generating an object model based on the plurality of extracted object features, wherein the object model is associated with an object-identifier. In one aspect, the object is updated with additional object features extracted from one or more additional optimal object images extracted from an additional video file. In another aspect, the object model is an electronic file. In a further aspect, the plurality of object features in the object model are weighted based on the relative importance of each feature. In one aspect, the relative importance is determined based on the addition of recurring features to an object model.

According to another aspect, the one or more optimal object images are identified based on properties of the image, wherein the image properties comprise one or more of resolution, occlusion, brightness, scale, and pose. In one aspect, the one or more optimal object images are identified by calculating a similarity score between the images in the object group and learned examples of optimal object images. In another aspect, the one or more optimal object images are images with properties that are conducive to modeling.

According to a further aspect, the method further comprises the steps of identifying one or more optimal object images from the images in the object group; retrieving one or more predefined object models, wherein each object model is associated with an object identifier; calculating an average similarity value between the one or more identified optimal object images and each of the one or more predefined object models. If at least one of the calculated average similarity values exceeds a predetermined average similarity threshold, then the object images in the object group are labeled according to the respective object identifier.

According to yet another aspect, the one or more optimal object images are identified based on properties of the image, wherein the image properties comprise one or more of resolution, occlusion, brightness, scale, and pose. In one aspect, the one or more optimal object images are identified by calculating a similarity score between the images in the object group and learned examples of optimal object images. In another aspect, the one or more optimal object images are images with properties that are conducive to modeling.

According to still another aspect, the method further comprises the step of if none, of the calculated average similarity values exceeds a predetermined average similarity threshold, the object images in the object group are labeled as unknown.

According to yet a further aspect, the average similarity value is calculated based on a predefined algorithm. In one aspect, the average similarity value is calculated by comparing object features of the optimal object images to object features of the one or more predefined object models.

According to an additional aspect, the similarity value is calculated based on a predefined algorithm. In another aspect, the similarity value is calculated by comparing object features, spatial features, and contextual features of the extracted object image from the particular frame to object features, spatial features, and contextual features of the subsequent extracted object image in the subsequent frame. In one aspect, the spatial features comprise data associated with physical distances in images, and the contextual features comprise data associated with elements surrounding an object image in a frame. According to a further aspect, the object group is stored in a database. In one aspect, the object group comprises a plurality of object images similar to the extracted images.

According to another aspect, the object images comprise images of faces.

According to another embodiment, the present disclosure is directed to a method of tracking a specific object through a plurality of frames of a video, wherein each frame of the video includes a plurality of objects. The method comprises the steps of dividing the video into one or more scenes; identifying an image of the specific object in a first frame of one of the one or more scenes; assigning the image of the specific object from the first frame of the respective scene to an object group; and analyzing a subsequent frame of the respective scene to identify a potential additional image of the specific object. Next, a similarity value is calculated between the image of the specific object from the first frame and the potential additional image of the specific object from the subsequent frame. If the calculated similarity value exceeds a predetermined similarity threshold, the potential additional image is assigned to the object group. In one aspect, the steps of analyzing and calculating are repeated for additional subsequent frames of the respective scene whereby the object group has assigned thereto all images of the specific object in the analyzed frames of the video.

According to one aspect, the method further comprises the step of selecting the specific object from the plurality of objects in the first frame of the one or more scenes.

According to another aspect, the step of assigning the image of the specific object to the object group includes associating in a database the image with the frame from which the image was identified.

According to a further aspect, the subsequent frame is a frame immediately following the first frame. In one aspect, there is at least one interposing frame between the first frame and the subsequent frame.

According to yet another aspect, the step of calculating a similarity value comprises comparing object features of the image of the specific object from the first frame and the potential additional image of the specific object from the subsequent frame.

According to another embodiment, the present disclosure is directed to a method for generating an object model from one or more images in a video. The method comprises the steps of receiving a video file, wherein the video file comprises a plurality of video frames; and detecting an object image from one of the plurality of video frames. If the detected object image is an optimal object image, a plurality of object features are extracted from the optimal object image. Next, it is determined whether an object model already exists for the object represented by the optimal object image. If an object model does not exist for the object, an object model is generated comprising the plurality of object features extracted from the optimal object image.

According to one aspect, the method further comprises the step of if an object model already exists for the object, adding the plurality of features extracted from the optimal object image to the already-existing object model.

According to another aspect, the plurality of object features comprise image data associated with the optimal object image. In one aspect, the plurality of object features in the object model are weighted based on the relative importance of each feature.

According to another aspect, the object model is an electronic file.

According to a further aspect, the method further comprises the step of determining that the detected object image is an optimal object image based on properties of the image, wherein the image properties comprise one or more of resolution, occlusion, brightness, scale, and pose. In one aspect, the method further comprises the step of determining that the detected object image is an optimal object image by calculating a similarity value between the detected object image and learned examples of optimal object images.

According to an additional aspect, the object image comprises an image of a face.

According to an additional embodiment, the present disclosure is directed to a system for identifying object images from videos. The system comprises a processor and a computer program product, wherein the computer program product includes a computer-readable medium that is usable by the processor, the medium having stored thereon a sequence of instructions that when executed by the processor causes the execution of the steps of retrieving a video, wherein the video comprises a plurality of frames; extracting a plurality of object images from the plurality of frames; and grouping similar object images together into a group based on a similarity score calculated between features in the object images. Further steps include calculating an average similarity score for one or more object images in the group as compared to one or more stored object models, wherein each object model is associated with an object identifier; and if the calculated average similarity score exceeds a predefined threshold, identifying the object images in the group based on the object identifier.

According to one aspect, the one or more object images used to calculate the average similarity score comprise optimal object images. In another aspect, the system is further configured to execute the step of identifying optimal object image based on properties of the image, wherein the image properties comprise one or more of resolution, occlusion, brightness, scale, and pose. In another aspect, the system is configured to execute the further step of identifying optimal object images by calculating a similarity score between the object images in the group and learned examples of optimal object images.

According to another aspect, the system comprises a database for storing one or more videos and the one or more object models.

According to a further aspect, the system is configured to execute the step of if the calculated average similarity score does not exceed the predetermined threshold, the object images in the group are labeled as unknown.

According to yet another aspect, the average similarity score is calculated based on a predefined algorithm. In one aspect, the average similarity score is calculated by comparing object features of the one or more object images to object features of the one or more stored object models.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein:

FIG. 6 is a listing of episodes of the television program Gilmore Girls, including identifiers associated with each episode, the title of each episode, and the number of frames in each episode, which were used for testing an embodiment of the present system.

FIG. 7 shows the facial detection and grouping results for each tested episode of the television program Gilmore Girls.

FIG. 9 is a table listing several of the plotted data points shown in FIG. 8 for 100% and 90% precision values for each tested episode.

FIG. 10 illustrates a table listing the average precision and recall values for the eight major characters presented in ep04 based on testing via a pure episode model.

FIG. 11 is a confusion matrix for the eight identified major characters listed in FIG. 10.

FIG. 13 is a table listing several of the plotted data points shown in FIG. 12 for 100% and 90% precision values for each merged episode combination.

FIG. 14 is a table listing the average precision and recall values for the twelve major characters presented in ep00-ep04 based on testing via merged models.

FIG. 15 illustrates a confusion matrix for the twelve identified major characters listed in FIG. 14.

DETAILED DESCRIPTION

Figure 1:
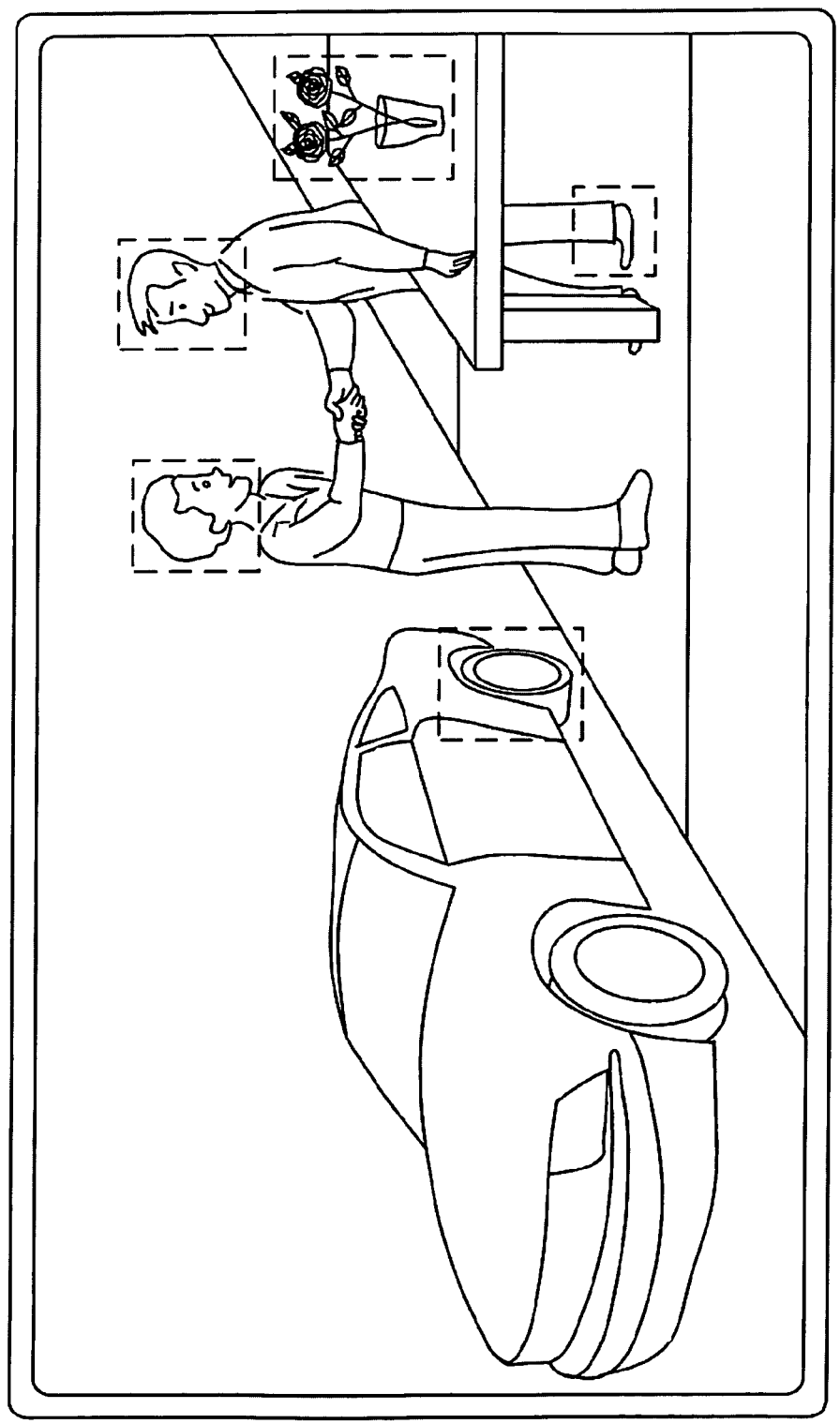
FIG. 1 illustrates a sample frame of a video scene indicating recognized images from within the frame.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Overview

Aspects of the present disclosure generally relate to systems and methods for detection, modeling, recognition, and tracking of objects within video content. Aspects of the present disclosure further relate to indexing and retrieval systems for videos based on generated object models. Generally, the system enables computation of a global object model for each particular object in one or more videos from automatically-selected optimal object images, via an optimal object classifier (discussed in greater detail below). These objects include people, faces, articles of clothing, plants, animals, machinery, electronic equipment, food, and virtually any other type of image that can be captured or presented in video. Further, the global object models are configured to be as broad or granular as desired by a system operator or user, such as a broad "automobile" model, or, alternatively, a model for a specific make, type, and year of car. The global object models are generally comprised of features encoded with an affine-invariant descriptor, and thus are insensitive to location and positioning (i.e. rotation) of the object image in a video, as well as resolution variations, lighting differences, and other image characteristics.

Embodiments of the present system further generate local object models for each image recognized in a particular video, and compare those models to the plurality of global models to determine if a match has occurred. Generally, a weighted graph-matching algorithm is designed and utilized for object recognition. Embodiments of the local models typically encode both spatial and contextual information from the video to enable tracking of the object images undergoing pose or positioning changes within a shot or scene. By recognizing optimal object images and tracking them throughout a video, both optimal and non-optimal objects are identified, thus resulting in an accurate and practical object recognition system.

Embodiments of the present system are useful for a wide variety of applications, including video indexing and retrieval, video surveillance and security, unknown person identification, advertising, and many other fields. Generally, as will be described below, the present system is insensitive to variations in scale and focus within videos or images, and operates without any human intervention except for unknown or initial object labeling. Accordingly, the present system is particularly advantageous for any application in which recognizing an object from a video with camera motion and a wide range of camera views, as well as object pose changes, is important.

For purposes of example throughout this document, facial recognition examples will often be described. Facial recognition is a widely-applicable field, and has many commercial applications. It should be understood, however, that the present systems and methods are in no way limited to facial images, and the present systems and methods may be applied to virtually any object image from within a video or still photograph. Accordingly, facial recognition systems will often be described for illustrative purposes only, and are in no way intended to limit the scope of the present disclosure.

As will be understood and will become apparent below, embodiments of the present system may be operated in a computer environment including databases and other storage apparatuses, servers, processors, terminals and displays, computer-readable media, algorithms, and other computer-related components. Further, any results or outputs relating to detection, modeling, recognition, indexing, and/or tracking of object images within videos may be stored in a database, output as an electronic or printed report, displayed on a computer terminal, or otherwise delivered to a system operator or user for analysis and review.

Figure 2:
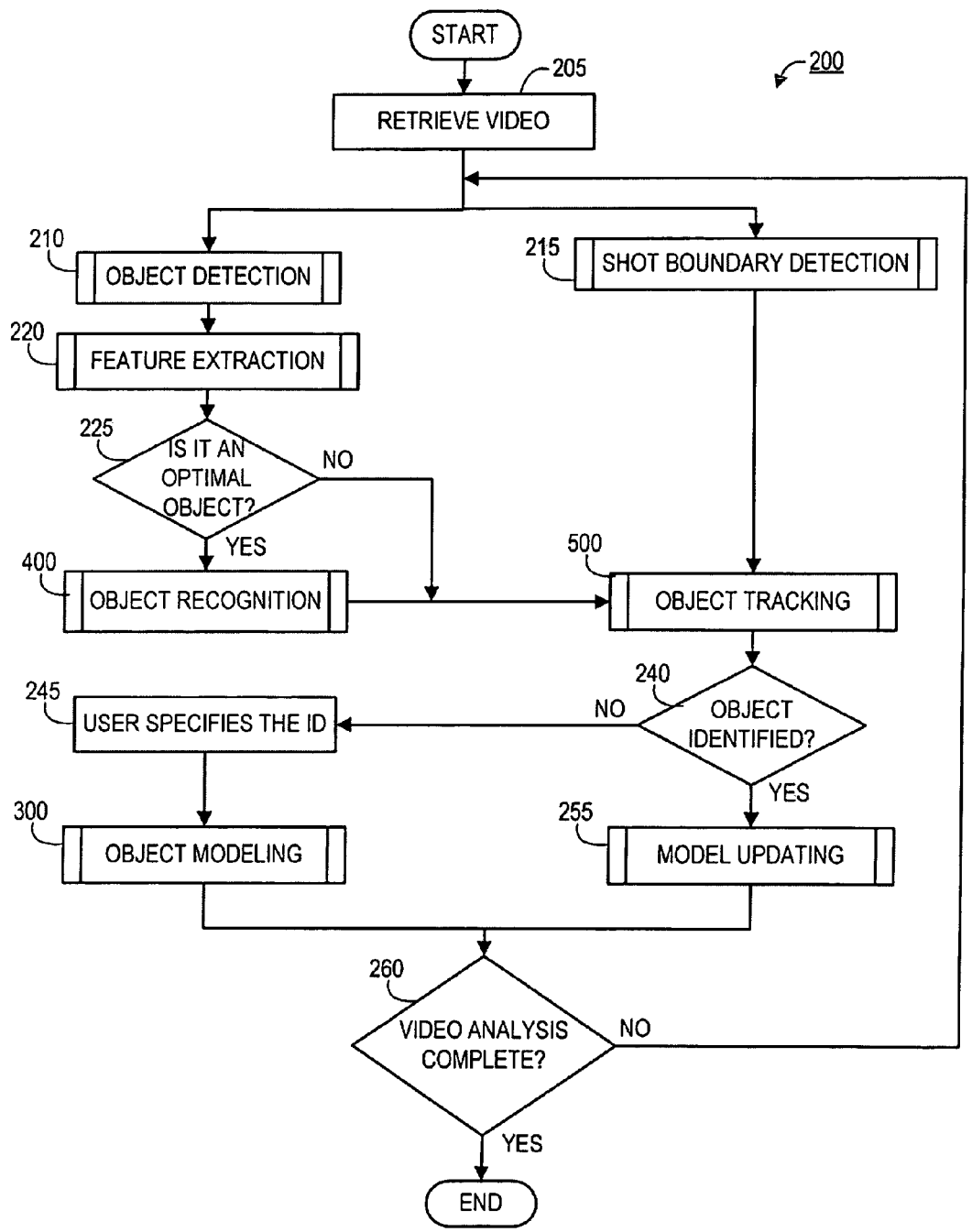
FIG. 2 illustrates a flowchart describing the steps involved, from a high-level, in one embodiment of the present system for detecting, modeling, recognizing, and tracking object images throughout one or more videos.

Referring now to the drawings, FIG. 2 illustrates: a flowchart 200 describing the steps involved, from a high-level perspective, in one embodiment of the present system for detecting, modeling, recognizing, and tracking object images throughout one or more videos. The overall process 200 will be described initially in a broad sense in conjunction with FIG. 2, and the details and specific aspects of each component of the system will be described in more detail below. Additionally, because embodiments of the present system utilize virtually the same procedure for generating initial global models as they do for subsequently updating and modifying those models, the flowchart shown in FIG. 2 demonstrates the iterative flow that may apply regardless of whether the system is generating an initial model, or recognizing and tracking objects after many global models have been generated.

As shown in FIG. 2, at step 205, the system retrieves a video to be analyzed. As will be understood, the video may be retrieved from a database, digital disc, tape, online storage apparatus, or some other similar storage mechanism. As will also be understood, while FIG. 2 shows the overall process 200 of the present system as it relates to a single video, the process may be extrapolated to analyze a plurality of videos. Once the video has been retrieved, the video undergoes a process of detection of objects and extraction of object features from video images (processes 210, 220). Concurrently, shots or scenes are detected in the video via a shot/scene boundary detection procedure (process 215). The shots or scenes of the video are extracted to provide a sequence of images for analysis by the system, and each detected shot or scene is individually analyzed. Generally, the term "shot" or "scene" refers to a grouping of frames or images recorded by either a stationary or smoothly-moving camera, with little or no background change between the frames, corresponding to one continuous time period. In one embodiment, the shot boundary detection procedure is accomplished via a process as described in Z. Rasheed and Mubarak Shali, *Scene Detection in Hollywood Movies and TV Shows,* IEEE Conference on Computer Vision and Pattern Recognition (2003), which is incorporated herein by reference in its entirety and made a part hereof.

At process 210, object images are detected from video scenes using wavelet features of the images in combination with an Adaboost classifier. As described herein, a "wavelet" generally describes a robust to moderate lighting change and/or a small shift or deformation in an analyzed image. In some embodiments, a wavelet is analogous to a Gabor wavelet, which is described in detail in P. Viola and M. Jones, *Rapid Object Detection Using a Boosted Cascade of Simple Features,* IEEE Conference on Computer Vision and Pattern Recognition (2001). As described herein a "feature" or "local feature" generally describes an element of significance within an image that enables recognition of an object within the image. A feature typically describes a specific structure in an image, ranging from simple structures such as points, edges, corners, and blobs, to more complex structures such as entire objects. For example, for facial recognition, features include eyes, noses, mouths, ears, chins, etc., of a face in an image, as well as the corners, curves, color, overall shape, etc., associated with each feature. Features are described in greater detail below and throughout this document. Generally, an AdaBoost (short for "Adaptive Boosting") classifier refers to a machine-learning algorithm, and may be used in conjunction with other algorithms to improve overall performance. The AdaBoost classifier assists the system in learning to identify and detect certain types of objects, as described in greater detail below.

Once an object has been detected within a video frame, the system extracts the detected local features and encodes the features with affine invariant descriptors (process 220). The extracted local features are used for both global and local object modeling, as well as object recognition and tracking. Generally, affine geometry is a form of geometry featuring the unique parallel line property (i.e. the parallel postulate), but in which the notion of angles is undefined and lengths cannot be compared in different directions. Affine geometry can be developed in terms of vectors, with or without the notion of coordinates. Essentially, affine space is a space of "free vectors". Thus, detected features encoded with affine invariant descriptors are not limited by the particular coordinates or locations in the image from which they were extracted. Accordingly, in embodiments of the present system, there is no need for accurate and tedious manual cropping and registration of detected objects, as is the case with traditional systems, such as those described in the Turk and Pentland reference.

After the local features for a given object have been extracted, the system determines whether the object is an optimal object (step 225). As used herein, an "optimal" object is one that is conducive to accurate object modeling. For example, frontal poses of faces are easier for people, and facial recognition systems, to recognize. Thus, when only optimal object images from a video are used to generate an object model, the model is generally more accurate and consistent in identifying objects as compared to models that incorporate all images from the video. Other examples of object images that are non-optimal are images that are partially occluded, are in a shadow, have low resolution, are in unique or awkward poses, etc. In one embodiment, the present system is able to identify optimal object images based on a learned, optimal-object classifier, as described in greater detail below. Additionally, the present system is accurate in identifying objects and faces from all angles, resolutions, etc., based on the recognition and tracking processes described below, even though the models are based primarily on optimal faces. Therefore, embodiments of the present system accurately recognize faces or objects from all angles, positions, and resolutions within a video, even though so based on models generated from predominantly optimal images. Traditional systems that are based on optimal object images are generally only accurate in identifying other optimal objects.

Figure 4:
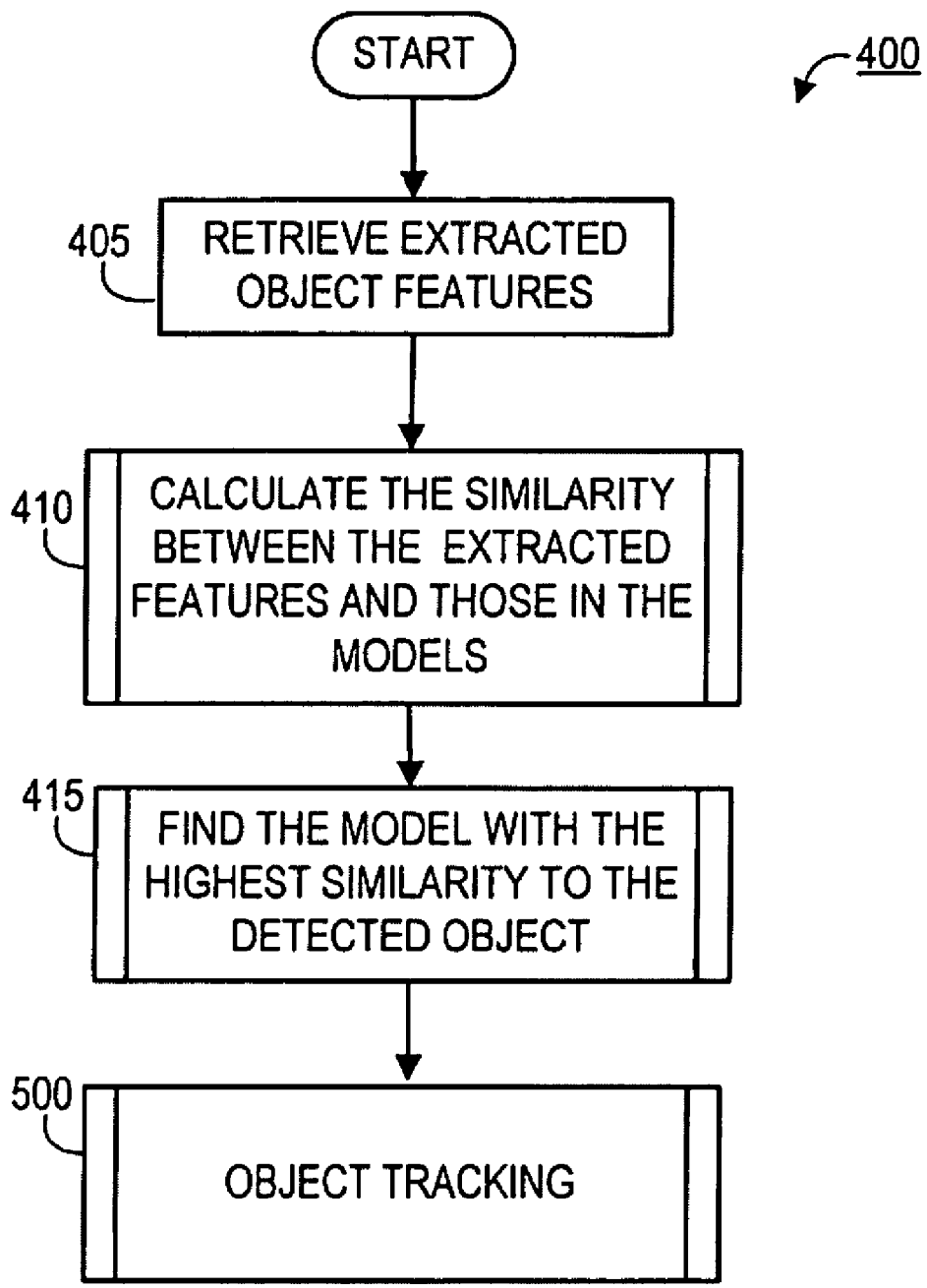
FIG. 4 is a flowchart depicting the steps and processes involved in an object recognition procedure according to an embodiment of the present system.

Still referring to FIG. 2, if the system determines that the extracted object image is an optimal image, then the object recognition process is initiated for that image (process 400, shown and described in greater detail in conjunction with FIG. 4). In one embodiment, a weighted graph-matching approach is designed for object recognition in each image frame. Generally, the object recognition process compares an extracted object image, or set of object images, to a database of predefined object models in order to "recognize" the extracted image as one of the models. Depending on whether the image is recognized or not, either an existing object model is updated or a new object model is created. After the object image has been processed via the face recognition procedure (process 400), or if the system determines that the given object image is not an optimal image, the image is passed through the object tracking process (process 500, shown and described in greater detail in conjunction with FIG. 5). In one embodiment, the object tracking process 500 utilizes a combination of local, contextual, and spatial features to track a detected object image from frame to frame within a video. The use of a tracking mechanism 500 within embodiments of the present system enables recognition and identification of non-optimal objects, allows for grouping of images (discussed below), and reduces false identifications and classifications of images.

As mentioned, the object recognition process 400 either recognizes an image as corresponding to a preexisting model, or determines that the image is unknown. In one embodiment, as shown at step 240, if the object is not identified, then the system prompts a system operator to specify an identifier for this new image (step 245), and a new object model is created for the new image (process 300, shown and described in greater detail in conjunction with FIG. 3). Preferably, however, in another embodiment, rather than labeling each object image, the system collects images into similarity groups during the object tracking process 500, and the system operator is only prompted to label each group. When images are grouped in this way, the overall number of labels that need to be applied is drastically reduced (as described in more detail below in conjunction with the object tracking process 500).

Regardless of whether a singular image or a group of images are being labeled, the system is reliant upon the system operator to specify an accurate label or identifier for the newly-identified object. For example, the recognized object image could include an actor or actress, a political figure, an animal, or some type of inanimate object. Regardless, the system operator assigns an identifier to the newly-identified object, such as "George W. Bush", or "Elvis". Once an identifier is assigned, the object image or images in a group are used to generate a new object model corresponding to that object (process 300). If, alternatively, the object or object group is recognized by the system as corresponding to a preexisting object model, then the corresponding global object model is modified and updated based on the new data associated with the identified image (process 255). In this way, global object models are continually updated based on new data to provide the most comprehensive and currents models available.

Still referring to FIG. 2, after either a new model has been created or an existing model has been updated, the system determines whether the analysis of the particular video is complete (step 260). The analysis is complete if all frames or shots in the video have been analyzed, or if the system operator aborts the process, or if some other similar process-ending event occurs. If the analysis is not complete (typically because there are additional, un-analyzed frames remaining in the video), then the overall process 200 is restarted at processes 210 and 215 for the next frame or image in the video. If the analysis is complete, then the process associated with the embodiment of the overall system 200 shown in FIG. 2 is ended.

Object Modeling

Within embodiments of the present system, virtually the same process is used for initial object modeling as is used for subsequent model updating and modifying. As used herein, a "model" or "object model" comprises a set of data, wherein the data is further comprised of features associated with an object image. The specific characteristics of these features are described in greater detail below and throughout this document.

As described previously, before an image from a frame of a video can be modeled and recognized, it must be detected as a general type of image. For example, a face image in a video must be detected as a face before the system can determine whose face it is. Thus, in order to detect images, the present system learns and creates a general model for the type of object to be modeled using wavelet transforms and an AdaBoost classifier. In one embodiment, a "general model" is one that relates to a general type or class of objects, such as faces, cars, animals, and the like. In order to learn, the system is provided with image features (i.e. "trained") that are shared by all objects within the particular object type. For example, a general face model includes features that are shared by virtually all faces, such as a nose, mouth, eyes, ears, chin, and other similar features. As the system is provided with additional examples of facial features, the general model learns what a typical face image looks like for many different kinds of faces, and thus develops the capability to take into account variations in these features, such as eye or skin color, overall size or scale of features, etc. Based on the provided image features, the AdaBoost classifier enables the system to learn which features are typical for the given object type, and promotes association of those features with the general object model for that type.

Figure 3:
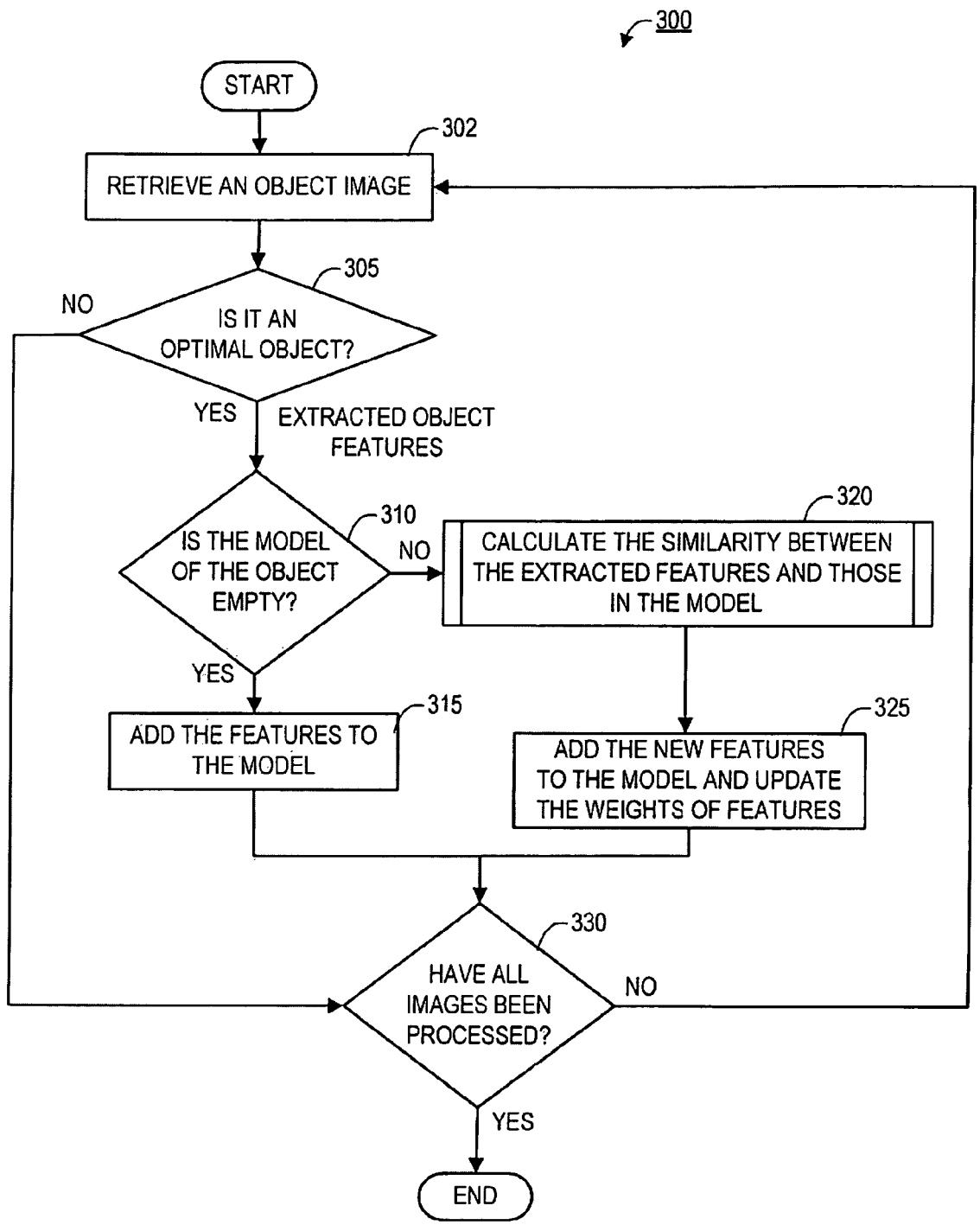
FIG. 3 is an object modeling flowchart showing the general steps involved in creating a new object model, as well as updating a preexisting model, according to one embodiment of the present system.

Referring now to FIG. 3, an object modeling flowchart 300 is shown describing the general steps involved in creating a new object model, as well as updating a preexisting model, according to an embodiment of the present system. As shown, the process 300 of FIG. 3 assumes that an object has already been detected in an image. Additionally, the process 300 shown in FIG. 3 illustrates a reiterating process for analyzing one image frame in a video or many image frames in a video or scene. Initially, at step 302, the present system retrieves an object image to be used for modeling. As will be understood, this image is retrieved from an established object group (described in detail below in conjunction with FIG. 5), or directly from a video, or from some other similar location. At step 305, the present system determines whether the retrieved object is an optimal object. In one embodiment, the system is able to select optimal objects via an optimal-object classifier, which is an algorithm designed to identify and select optimal objects based on training data provided to the classifier. The optimal-object classifier is a leaning algorithm (similar to the AdaBoost classifier) that, after being provided with training data from a system operator comprising a plurality of examples of optimal objects, is able to identify which objects are optimal in a given video. Essentially, optimal object images are ones that include resolution, brightness, pose, occlusion, and other properties that exceed some predefined threshold (i.e. "good" or clear images). As discussed previously, creating models with optimal objects enables the present system to more accurately identify particular objects in a video, and then track those objects through non-optimal poses via a tracking process 500 (described in greater detail below).

If the present system determines that the detected object is not an optimal object, then it does not use the object for modeling, but instead passes the object image to step 330, which determines whether all images in the given group, video, or other select set have been processed. If all images have been processed, then the modeling procedure 300 is completed. If, however, all images have not been processed, then the process 300 returns to initial step 302 and retrieves the next object image in the set. Returning to step 305, if the object is deemed optimal, then the features of the object image are extracted, and the system determines automatically whether the model of the particular object is "empty" (i.e. whether a model file already exists for this particular object) (step 310). In one embodiment, a system operator is prompted for a model file identifier for the particular object, and this identifier is used to verify whether the particular file is empty or not.

For creating particular, global models for subsequent use in object recognition, more discriminative and detailed features than those used for general model detection should be extracted from the given image. One example of such features are local features generated or identified via the "scale invariant feature transform" (SIFT), described in detail in D. G. Lowe, *Object Recognition from Local Scale-Invariant Features,* International Conference on Computer Vision, pp. 1150-57. (1999), which is incorporated herein by reference in its entirety and made a part hereof. As will be understood, SIFT (and other similar methods) transforms an image into a large collection of local feature vectors, each of which is invariant to affine transform, occlusion, illumination change, translation, scaling, rotation, and other similar image variations. Additionally, as will also be understood, different types of feature recognition algorithms should be developed for each particular type of object to be detected and modeled. For example, in one embodiment of the present system, local features are specifically developed for facial analysis and recognition. In another embodiment, features are specifically designed for analysis and recognition of food images. As will be appreciated, features may be developed for virtually any type of object in an image.

In one embodiment of the present system, local features are developed using SIFT for facial features. Generally, these are complementary features including both corner-like and blob-like structures in an image, which are calculated at scales determined by a saliency measure, and are encoded with a SIFT descriptor. In one embodiment, corner detection is based on the eigenvalues of the second moment matrix, and blob detection is based on the Hessian determinant and the Difference of Gaussians (DoG) function. Once the feature points have been found, the system determines their characteristic scales and/or the sizes of their support regions. Generally, the radius of a support region is proportional to the characteristic scale. In one embodiment, the scales at which Shannon entropy peaks are chosen as the feature-space saliency metrics. Generally, Shannon entropy is a quantitative measure, in the sense of an expected value, of the information contained in a message, usually in data units such as bits. Once the scales are chosen, the entropy value is weighted at such scales by some measure of the self-dissimilarity in the scale space of the features. These weights are then utilized to provide relative importance to some features over others, as described in more detail below.

Still referring to the object modeling process 300 described in FIG. 3, if the system determines that the model associated with the particular extracted object is empty (step 310), then the extracted features are added to a model for that particular object image, and thus a new model for that object image is generated (step 315). In one embodiment, the model is stored as a file in a database within the present system, and each new model corresponds to a separate file. If, alternatively, the model of the object is not empty (i.e., a model file already exists for the particular object image), then the system calculates the similarity between the extracted features and those already existing in the model (process 410), as described in greater detail below. For features that are determined to be similar to those already existing in the model, the relative weights of those features are updated, as it is assumed that these features are prominent in the object because they are reoccurring (step 325). Features that are not similar to those already existing are added to the model as new features (step 325), and thus the model becomes more robust as it develops additional features, that can be used to recognize object images in subsequent recognition procedures. Once either a new model is created (step 315) or an existing model is updated (step 325), the system determines whether all images have been processed (step 330). As mentioned, if all images have been processed, the modeling procedure 300 is ended. If all images have not been processed, then the object modeling-procedure 300 reiterates for the next image in an object group until all images in a given group have been analyzed.

In one embodiment, the present system utilizes the same procedure for extracting model features for use in creating and updating models as it does for extracting image features from an object image for recognition purposes. This is in contrast with conventional methods in which model features are selected and defined manually (which is a highly labor-intensive procedure, as described in L. Wiskott, et. al, *Face Recognition by Elastic Bunch Graph Matching,* Intelligent Biometric Technologies in Fingerprint and Face Recognition, pp. 355-96 (1999)), whereas image features are selected using an algorithm. Often, when model features are hand selected by an operator, they match inconsistently with algorithm-selected image features. Embodiments of the present system overcome this problem by selecting model features and image features automatically based on the feature extraction process 220.

As a model within an embodiment of the present system is updated by changing the weights of its features or by adding new features, the model becomes more accurate in detecting and recognizing objects in an image. For example, in a facial recognition embodiment, a given character's or actor's appearance often changes over time, due to weight gain, hair loss, aging, or other similar reasons. Conventional facial recognition models are typically fixed models, and thus are only keyed to recognize the given actor as he or she appeared at a given point in time. With embodiments of the present system, however, each model is updated over time as new episodes or videos are released, and thus each model adapts and changes in response to changes in a given actor's appearance.

Object Recognition

After one or more object models have been generated via the object modeling process 300, the present system is able to recognize and identify objects from images in videos that match those models. Generally, a weighted graph-matching approach is employed for object recognition; an example of such approach is explained in detail in the Wiskott reference. In one embodiment, the nearest neighborhood-method is utilized to match features extracted from an object image to corresponding model features, and the number of matched features is used to determine the similarity between the detected object and the object model. As will be understood, a neighborhood operation is one in which computations are applied on an image based around a point or group of points in the image.

FIG. 4 is a flowchart depicting the steps and processes involved in an object recognition procedure 400 according to an embodiment of the present system. The process 400 shown in FIG. 4 is for one image or frame extracted from a video, but as will be appreciated, this process is typically repeated for each optimal object image in the video. At step 405, the system retrieves the features that have been extracted from an image. As mentioned previously, some features have higher weights than other features based on the relative importance of those features. For example, in a facial recognition embodiment of the present system, features in the upper part of a face are generally more stable and discriminative than those in the lower part of the face because the upper part of the face remains more stationary as compared to the mouth, jaw, etc., in the lower part. The features with higher stability are learned during the training procedure when models are generated (i.e. based on reoccurrence of many feature vectors), and thus those features are encoded with higher weights. Accordingly, the features with higher weights reflect the consistent intrinsic attributes of a particular object that is associated with a corresponding model.

Once the extracted features have been retrieved, the similarity is calculated between the extracted features and the features in the model(s) (process 410). The similarity is calculated based on a weighted feature similarity measure (as shown in Equation (1)), and is designed for evaluating the similarity between the detected, extracted object and the object model(s) at the feature level. The weighted similarity measure is the weighted sum of the matched features, and is represented by the following equation:

$$\text{Sim\_f}(I, M) = \frac{1}{N} \sum w_i((f_j^I - f_i^M) < T), \quad (1)$$

where N represents the number of features in the given model, $f_j^I$ and $f_i^M$ are the matched features from the detected object I and the object model M, respectively, and $w_i$ is the weight of each feature $f_i^M$. Two features are considered to be matched to each other if their distance is less than some predetermined threshold, T.

In one embodiment, the extracted features are compared (via Equation (1)) to all models stored in the overall system. This procedure is accomplished according to an algorithm that repeats Equation (1) for the extracted features for all models. The model that achieves the highest similarity score, based on all features, to the extracted features is considered the "match" for the detected object (step 415). This procedure is described in further detail below.

The weighted similarity measure as described by Equation (1) does not constrain the spatial relationships between local features, and thus sometimes causes incorrect matching. Generally, the term "spatial relationships" refers to the physical distance or orientation of a feature in an image. For example, in a facial recognition embodiment, a left eye extracted from an image may be incorrectly matched to a right eye in a model because spatial relationships are ignored. Accordingly, in one embodiment, an image graph is utilized to model the spatial relationships between features, wherein the nodes in the image graph represent the local features and the edges represent the distances between the extracted features and image features. Generally, in a graph, an edge refers to a line, and a node refers to an intersection of two or more lines. Unlike in traditional systems such as those described in the Wiskott reference, in which the graphs are designed manually by a system operator, the graphs used in embodiments of the present system are generated automatically based on training data. A graph similarity measure is designed for evaluating the spatial similarity between a detected object and an object model, as represented by the following equation:

$$\text{Sim\_g}(I, M) = \frac{1}{E} \sum \frac{(\Delta x_e^I / \Delta x_e^M - \overline{m})^2}{\overline{m}^2}, \quad (2)$$

where $$\overline{m} = \frac{1}{E} \sum \frac{\Delta x_e^I}{\Delta x_e^M}$$

is the average length ratio between the image and the model, E is the number of edges in the graph, and $\Delta x_e^I$ and $\Delta x_e^M$ are the lengths of corresponding edges in the image and model, respectively.

By combining local feature and global spatial information, a combo-similarity measure is derived for evaluating the overall similarity between an object image I and an object model M, as shown in the following equation:

$$\text{Sim}(I,M) = \text{Sim\_f}(I,M) - \lambda \text{Sim\_g}(I,M), \quad (3)$$

where λ determines the relative importance of local features and spatial relationships. In one embodiment, λ is a predetermined value set by a system operator. In one embodiment, when there are more than two model features within a predetermined threshold distance of an image feature, the system selects the model feature that maximizes the combo-similarity measure as defined in Equation (3). It will be appreciated that using a combo-similarity measure reduces mismatches in similar features, such as between corners of a left eye and right eye or between a mouth and eyes in a facial recognition embodiment of the present system.

Still referring to FIG. 4, once the model with the highest similarity to the extracted object has been determined based on the combo-similarity measure (process 415), the extracted object and corresponding frame are passed to the object tracking process 500 for grouping and further analyzation.

Object Tracking

Within embodiments of the present system, object images are tracked through videos via an object tracking procedure (described in detail below in conjunction with FIG. 5). One purpose of tracking object images across frames throughout a video is so that fewer images are required to be correctly recognized in order for the system to identify a large portion of images in the video. For example, in facial recognition systems, it has been proven that recognition rates are higher for frontal facial images of high resolution as compared to profile facial images and/or low-resolution images (see P. Jonathon Phillips, et al., *Face Recognition Vendor Test* 2006 *and Iris Challenge Evaluation* 2006 *Large-Scale Results*, National Institute of Standards and Technology (2007)). Therefore, by recognizing frontal or optimal faces and tracking them through a video, embodiments of the present system are able to identify both frontal and profile faces. Essentially, as an object's positioning, resolution, or lighting changes across a video, some previously unseen features appear, and some existing features become occluded. Thus, some image frames are poor candidates for recognition, or the system is simply unable to detect or recognize objects in those frames. But, by identifying images in previous frames, and tracking those images across subsequent frames, occluded or difficult-to-identify images are typically identified.

Another advantage or purpose of tracking object images is to arrange those images into groups, which reduces the number of unknown objects that must be labeled by a system operator. Additionally, by only recognizing optimal or frontal images, the system is required to perform fewer operations, thus increasing calculation speeds and overall system performance.

Figure 5:
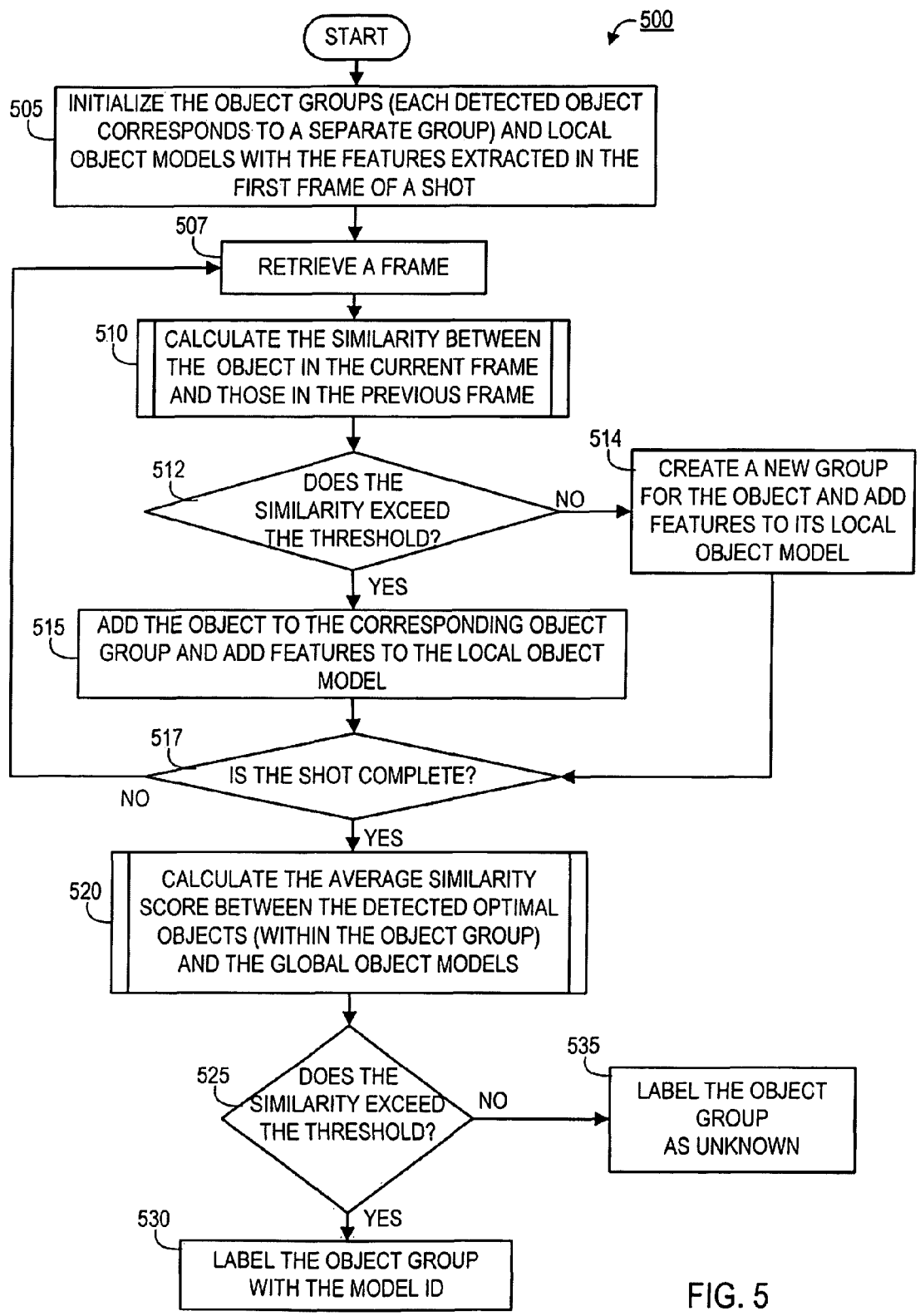
FIG. 5 shows a flowchart of an object tracking procedure according to one embodiment of the present system.

Referring now to FIG. 5, a flowchart is shown describing an object tracking procedure 500 according to one embodiment of the present system. While the object tracking procedure 500 shown in FIG. 5 is for a singular shot or scene (i.e. sequence of continuous frames shot by a single, stationary camera or camera undergoing smooth motion) in a video, it will be understood that this procedure is typically extrapolated and reiterated for all shots within a video or plurality of videos. At step 505, local features are extracted from an initial frame (usually the first frame in a shot), and a local object model is initialized for the given object. As mentioned previously, a local object model is a model created from the extracted features in a video, and a new local model is generally created for each new video being analyzed. In one embodiment, the local object model is used for comparison to a global object model to determine if a match exists between the local model and global model based on a similarity calculation.

In one embodiment, for purposes of object tracking, the local model includes not only local features of the object, but also spatial and contextual feature's surrounding the object image. Generally, the spatial features define distances and overall sizes of object features in the image. Contextual features are image characteristics surrounding an object that assist in verifying an object between frames. For example, in a facial recognition system, contextual features include the color and overall look of clothing a given person in the video is wearing, or an object the person is holding, etc. Thus, in one embodiment, local models include these spatial and contextual features in order to increase accuracy when tracking objects across frames. Therefore, local models often vary greatly throughout a video as a character changes clothes or engages in varying actions.

Also at step 505, one or more object groups are initialized based on each detected object from the extracted features. Generally, an object "group" refers to a collection of objects that share similar features. Thus, as will be described below, if an object in one frame is similar to an object in a subsequent frame (based on some predetermined similarity threshold), then the two objects are grouped together. This grouping function assists in the overall tracking procedure 500, and reduces system operator intervention (i.e. labeling).

At step 507, the system retrieves a subsequent frame from the given shot or scene Generally, this is the next frame in the sequence. For example, after object groups and local object models are initialized at step 505 for the initial frame in a shot, the system retrieves the second frame in a shot. Once the second frame has been analyzed and tracked by the tracking process 500, the procedure reiterates (as shown in FIG. 5) until all frames in a shot have been tracked. After the given frame has been retrieved (step 507), the similarity between the features in the given frame and those in the previous frame is calculated based on Equations 1-3 presented above (process 510). Because the local object models often include spatial and contextual features, these features are compared to those in the previous frame. In one embodiment, process 510 is carried out using Equations 1-3, but instead of comparing an object image to a global model, the system compares a local model from one frame to a local model in the previous frame.

After the similarities have been calculated for each object in the two given frames, the system determines whether the calculated similarities exceed a predetermined threshold (step 512). If the similarities do not exceed the threshold, then a new object group is created for the particular object, and its corresponding features are added to its local object model (step 514). Generally, an assumption is made that the locations of the local, spatial, and contextual features in an image do not change significantly between two consecutive frames, assuming those frames are part of one scene in a video. This assumption is based on the idea that cameras and/or objects in a video do not move greatly from one frame to the next within a shot. If they do, then the similarity measure reflects this disparity, and it can be assumed that the two frames present a scene change or other abrupt change. Accordingly, in these circumstances, spatial and contextual features are ignored, and matches are made based only on local features of a detected object, as object images in the subsequent scene are likely to be different from those in the previous scene. This disparity between features (i.e. similarity measure below the threshold) suggests a significant image change between the two frames, which is why a new object group is created at step 514.

If the similarity measure for any of the detected objects calculated during process 510 exceeds the threshold, then those objects are added to their corresponding object groups, and their features are added to their corresponding local object models (step 515). Next, at step 517, the system determines whether the given shot or scene is complete. This determination is made based on the previous division of shots at process 215 (described above). If the shot is not complete (i.e. if additional frames remain in the shot), then steps 507-517 are repeated for the next frame in the shot. If, however, the shot is complete, then an average similarity score is calculated between the optimal object images in each group and the global object models stored in the system (process 520). Assuming one or more optimal objects exist within an identified group, the similarity measure is incrementally calculated for all optimal object images as compared to all stored global object models based on Equations 1-3, and one or more global object models are identified as potential matches for the group. These similarity measures are averaged to provide an overall confidence score for the group across an entire video.

At step 525, each average confidence score or similarity measure is compared to a predetermined threshold. In one embodiment, the predetermined threshold is set by a system operator based on a desired accuracy and/or precision of recognition and/or tracking. For example, a higher threshold yields more accurate results because a similarity measure must exceed that threshold to be identified as matching the given model. Thus, if a detected object group and an identified object model have a high similarity value, there is therefore a higher percentage chance that the object group was correctly recognized. However, a higher threshold value also produces a lower recall, as some images or groups that were in fact correctly recognized are discarded or ignored because they do not meet a high similarity threshold (i.e. the group was correctly recognized, but had too many differences from the model based on its images' poses, resolutions, occlusions, etc.). Alternatively, a low threshold leads to higher recognition of images as matching a given model, but it is also likely to produce a higher percentage of false identifications. As will be understood, the threshold value may be raised or lowered by a system operator depending on whether the operator would rather have higher accuracy, or more identifications.

At step 525, if the calculated average similarity exceeds the predetermined threshold value, then the system automatically labels the object group as corresponding to the identified model (step 530). For example, if the model corresponds to a famous actor, the object group is classified as including images of that actor. If, however, the average similarity does not exceed the threshold, then the object group is labeled as unknown or unidentified (step 535). Unknown object image groups are configured to be subsequently reviewed by a system operator for use in generation of new models. Or, if a system operator determines that the object groups were incorrectly classified as unknown, and they did in fact correspond to an already-existing model, then those groups and corresponding images can be used as training data to update an object model to reduce further misclassifications. In this way, as the system is provided with additional data and examples of objects, the system learns and develops models with better recognition accuracy (as shown and described below in conjunction with the Experimental Results section of this document).

In addition to the purposes and advantages of object tracking described above, a further benefit is that false positives of object recognitions are reduced because they likely do not fit into clearly established groups in a given video. For example, in a facial recognition embodiment, extras or crowds in a movie often produce false recognitions. However, because these recognitions are likely to be random and cannot be tracked over time (based on inconsistent or infrequent occurrences in a video), these false recognitions can be discarded as not belonging to a distinct group, and thus can be assumed to be false positives.

As mentioned previously, one application of embodiments of the present system is video indexing and retrieval. In order to accomplish such indexing and retrieval, in one embodiment, images in videos that have been identified and labeled as known objects (i.e. corresponding to model) are encoded with metadata attributes identifying those images. These encoded metadata attributes are generally stored in index files and are configured to be searched in order to locate and retrieve videos or portions of videos with the associated images. The system automatically encodes the video images based on identifiers associated with the corresponding object models. Accordingly, vast amounts of videos may be embedded with metadata and indexed according to object images in the videos by implementing embodiments of the present system.

Experimental Results

To demonstrate functional capability, an embodiment of the present system was tested to determine its image recognition and identification accuracy. The embodiment tested was configured for facial recognition. (i.e. the SIFT features were developed specifically for detecting, recognizing, and tracking facial features). The embodiment was tested on six episodes of the television program Gilmore Girls, as shown in FIG. 6, which is a listing of the tested episodes, including identifiers associated with each episode, the title of each episode, and the number of frames in each episode. Generally, the first five episodes (i.e. ep00-ep04) were used for generating or training character face models, and the last episode (i.e. ep06) was used for testing the generated models. On average, each episode was approximately 45 minutes long, consisting of approximately 32,000 individual frames, with a sampling rate of 12 frames/second.

As mentioned previously, grouping objects into clusters or groups is beneficial for a number of reasons, such as improved processing times and efficiency, reducing human (i.e. system operator) intervention, etc. Objects are grouped based on the object tracking process 500 described above. FIG. 7 shows the grouping results for each episode for the present experiment. As shown, between approximately 17,000-21,500 facial images were detected for each episode. The number of detected images varies as compared to the number of frames in each episode because some frames have no facial images, some images remain undetected, and other similar reasons. On average, these thousands of faces were clustered into approximately 120 groups for each episode. This grouping represents approximately a 94% reduction in the number of overall faces that require analyzation and labeling by a system operator. Accordingly, it can be assumed that each tested episode included approximately 120 different facial images corresponding to characters or actors in the show. As mentioned previously, however, because many of these identified images represent extras or actors that only appeared for a few seconds, many of these groups may be discarded as inconsequential.

During the experiment, two separate tests were conducted. One test compared models generated based on each episode alone to the images in ep06, whereas a second test compared merged models that were updated incrementally with each episode in the list to the images in ep06. The results for each test are presented below.

Facial Recognition Based on Pure Models from a Single Episode

As mentioned, pure character models were generated for detected facial images for each episode alone, and those models were tested against the images in ep06. The pure character models were generated using the object modeling procedure 300 described above.

Figure 8:
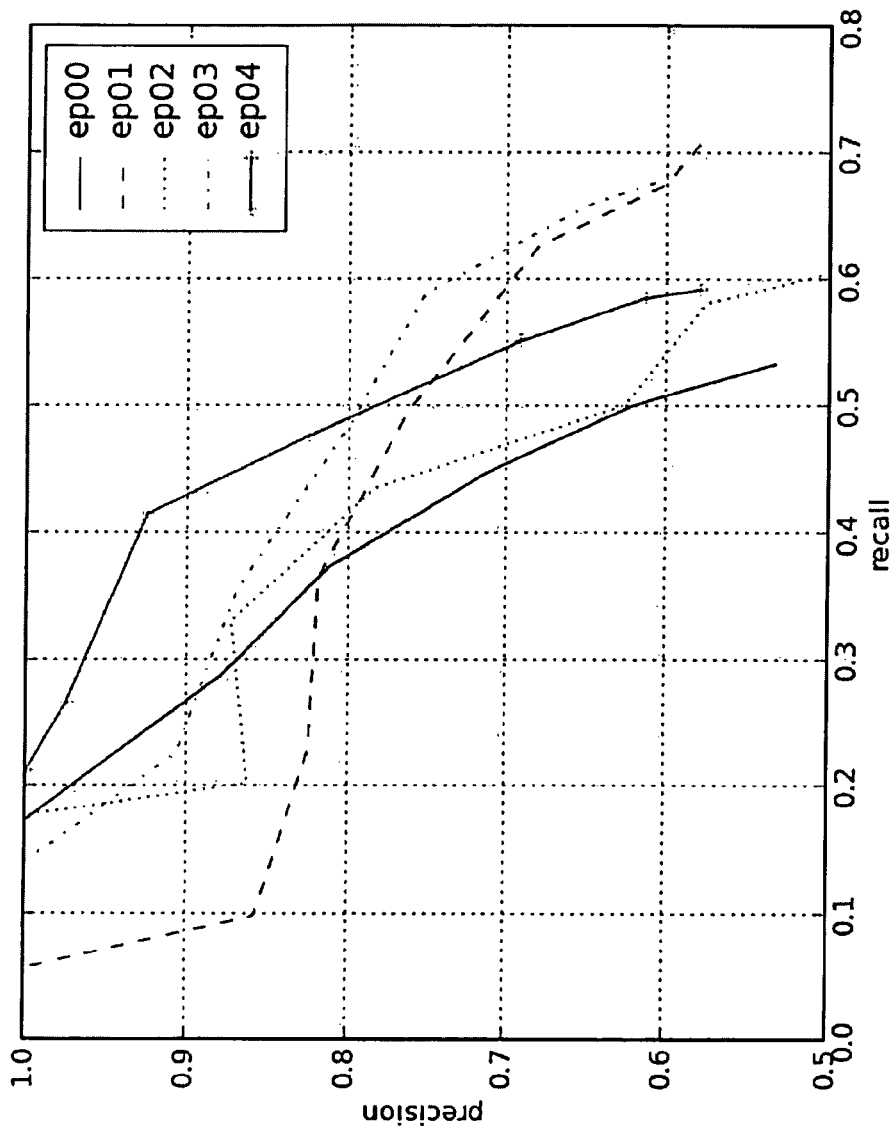
FIG. 8 shows a precision-recall curve for facial recognition using pure models learned from each tested episode alone.

FIG. 8 shows a precision-recall curve for facial recognition using the pure models learned from each tested episode alone. As used herein, "recall" represents the percentage of correct images detected from all images included in a video. For example, if a given video actually included 10 separate characters (and thus 10 separate global facial models), and 4 of those were correctly recognized then the recall would be 4/10, or 40%. As used herein, "precision" represents the percentage of correct images identified from all detected images. Thus, for example, if a given video included 10 separate characters, and 6 of those character images were detected but only 4 of those 6 were correctly recognized (the other two being incorrectly identified or labeled as unknown), then the precision would be 4/6, or 66%. For purposes of the present experiment, the characters considered as "actually" in an episode (i.e. the true value of characters in an episode) were determined based on system operator review and input. As shown in FIG. 8, the slopes of the plotted curves are generally fairly drastic, such that as recall increases incrementally, precision drops drastically. Among those tested, the models generated from ep04 performed the best.

FIG. 9 is a table listing some of the plotted data points shown in FIG. 8 (i.e. the recall percentages for precisions of 100% and 90%, respectively) for each episode. While the results varied somewhat, an average recall of 15.16% was achieved for a precision of 100%, and an average recall of 22.32% was achieved for a precision of 90%. As will be understood, the precision values are configured to be varied based on the threshold similarity value selected by the system operator. As also shown, ep04 achieved the best results, indicating a recall of 21.1% for 100% precision, and a recall of 44.2% for 90% precision.

Referring now to FIG. 10, a table is shown listing the average precision and recall values for the eight major characters presented in ep04. The two main characters in the show, namely Rory and Lorelai (represented by identifiers 2 and 7, respectively), achieved the highest precision and recall values. Rory achieved a recall of 32.1% at an 81% precision, and Lorelai, the episode's main character, achieved a 79.7% recall at a 97.9% precision. It is assumed that these two characters achieved the highest levels of precision and recall because they were present in the highest percentage of frames, and thus provided the most image data for modeling. Accordingly, these results provide evidence that models generated by embodiments of the present system learn as more data is provided, and thus the models update and become more accurate and reliable as additional image data is provided.

FIG. 11 is a confusion matrix for the 8 identified major characters listed in FIG. 10. The confusion matrix demonstrates the number of correctly-matched detected images, the number of incorrectly-matched images, and the number of detected images labeled as unknown for each of the eight characters listed in FIG. 10. Taking row 2 as an example (which corresponds to character 2 in ep004), 32 images that were initially detected as potential character 2 images were eventually labeled by the system as unknown (as shown under column 0). Had the system operator set a lower threshold similarity value, then many of these "unknown" images would have been correctly labeled, but at a lower precision (i.e. some would have also been incorrectly labeled). Column 2 indicates that 17 images were correctly labeled as those corresponding to character 2, and column 7 indicates that 4 images were incorrectly labeled as character 7 (instead of character 2). By analyzing a confusion matrix and adjusting similarity threshold values, a system operator is able to customize the results based on his or her performance requirements.

Facial Recognition Based on Merged Models from Multiple Episodes

As mentioned, merged character models were generated for detected facial images by merging models incrementally and testing each merged model against ep06. For example, models were generated based on ep00-ep01, and then models were generated based on a combination of ep00-ep02, and so on. Again, the models were generated using the object modeling procedure 300 described in conjunction with FIG. 3.

Figure 12:
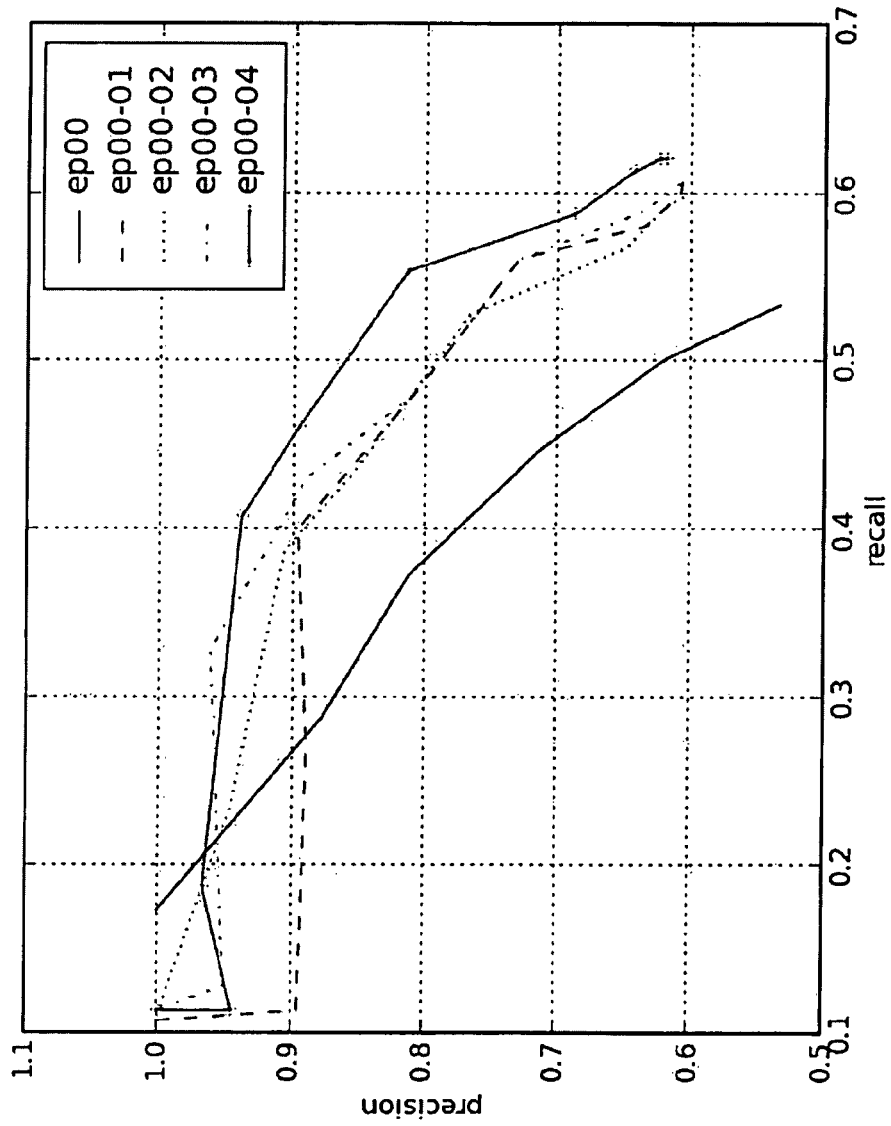
FIG. 12 shows a precision-recall curve for facial recognition using merged models learned by incrementally combining models from each tested episode.

FIG. 12 shows a precision-recall curve for facial recognition using the merged models learned by incrementally combining models from each episode. As shown, the slopes of the curves are generally less drastic than those of the pure models shown in FIG, 8, indicating a higher recall percentage for higher precision values for the merged models. This data suggests that as models are merged with other models, and thus include additional feature data, the models are better able to recognize images, and at higher precision values. This result is further evidenced by the fact that the models generated from all five episodes (i.e. ep00-ep04) performed the best out of all curves plotted in FIG. 12.

FIG. 13 is a table listing some of the plotted data points shown in FIG. 12 (i.e. the recall percentages for precisions of 100% and 90%, respectively) for each merged episode combination. As shown, the results among episode combinations did not vary as much as the pure models shown in FIG. 9. This is likely due to the fact that merged models become incrementally more accurate as more data is provided. As also shown, both the precision and recall values increased as each new episode was added to the models.

The table shown in FIG. 13 demonstrates that an average recall of 11% was achieved for a precision of 100%, and an average recall of 38.73% was achieved for a precision of 90%. While the recall for 100% precision for the merged models was actually less than that of the pure models (11% as compared to 15.16%), the recall for 90% precision for the merged models was nearly double that of the pure models (38.73% as compared to 22.32%). The lower recall for 100% precision for the merged models can likely be attributed to a statistical anomaly and the fact that some images, especially low-resolution images, may never achieve high recall percentages, no matter how much training data is presented. The drastically higher recall for the merged models at 90% precision, however, strongly indicates that when additional data is provided, the generated models produce more accurate and reliable results.

Referring now to FIG. 14, a table is shown listing the average precision and recall values for the twelve major characters presented in ep00-ep04. Just as with the pure models, the two main characters in the show, namely Rory and Lorelai (represented by identifiers 2 and 11, respectively), achieved the highest precision and recall values. Rory achieved a recall of 34% at 90% precision, and Lorelai, the show's main character, achieved a 76.3% recall at 97.4% precision. While Lorelai's precision and recall remained virtually unchanged as compared to the pure models, Rory's precision and recall both increased. This increase is attributed to additional data image data being provided for Rory's models, thus leading to more accurate similarity results.

FIG. 15 illustrates a confusion matrix for the twelve identified major characters listed in FIG. 14. Taking, for example, character 2, the confusion matrix identifies 33 "unknown"

detected facial images, 18 correctly-identified images, and only 2 incorrectly identified images. While these results are only slightly better than those presented for pure models in FIG. 11, they do show improvement.

Overall, the experiment proved that at least a facial recognition embodiment of the present system is able to correctly recognize some statistically significant percentage of facial images in videos. Further, the tests for merged models as compared to pure models confirm that embodiments of the present system have the capability to learn, and that generated models generally become more accurate and reliable as more training data is provided. Additionally, it should be noted that only five episodes of a television program were used to generated facial models; over time, as many videos within a television or movie series are used for modeling, it is understood that the generated models become highly robust and accurate.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A method for tracking object images in video files, comprising the steps of:
    receiving a video file, wherein the video file comprises a plurality of frames;
    extracting an image of an object from a particular frame in the video file;
    extracting a subsequent image of an object from a subsequent frame in the video file;
    calculating a similarity value between the extracted object image from the particular frame and the subsequent extracted object image from the subsequent frame;
    if the calculated similarity value exceeds a predetermined similarity threshold, collecting the extracted object images from the video file into an object group;
    extracting a plurality of object features from the extracted object images collected in the object group;
    generating an object model based on the plurality of extracted object features, where the object model is associated with an object identifier; and
    updating the object model with additional object features extracted from one or more additional object images collected in the object group but extracted from an additional video file.

2. The method of claim 1, further comprising the steps of:
    identifying one or more optimal object images from the images collected in the object group, where the plurality of object features are extracted from the one or more optimal object images identified from the images collected in the object group and where the plurality of object features comprise image data associated with the one or more optimal object images.

3. The method of claim 2, wherein the plurality of object features in the object model are weighted based on the relative importance of each feature.

4. The method of claim 2, wherein the one or more optimal object images are identified based on properties of the image.

5. The method of claim 4, wherein the image properties comprise one or more of resolution, occlusion, brightness, scale, and pose.

6. The method of claim 2, wherein the one or more optimal object images are identified by calculating a similarity score between the images in the object group and learned examples of optimal object images.

7. The method of claim 1, further comprising the steps of:
    identifying one or more optimal object images from the images in the object group;
    retrieving one or more predefined object models, wherein each object model is associated with an object identifier;
    calculating an average similarity value between the one or more identified optimal object images and each of the one or more predefined object models; and
    if at least one of the calculated average similarity values exceeds a predetermined average similarity threshold, labeling the object images in the object group according to the respective object identifier.

8. The method of claim 7, further comprising the step of if none of the calculated average similarity values exceeds a predetermined average similarity threshold, labeling the object images in the object group as unknown.

9. The method of claim 7, wherein the average similarity value is calculated based on a predefined algorithm.

10. The method of claim 7, wherein the average similarity value is calculated by comparing object features of the optimal object images to object features of the one or more predefined object models.

11. The method of claim 1, wherein the similarity value, is calculated based on a predefined algorithm.

12. The method of claim 1, wherein the similarity value is calculated by comparing object features, spatial features, and contextual features of the extracted object image from the particular frame to object features, spatial features, and contextual features of the subsequent extracted object image from the subsequent frame.

13. The method of claim 12, wherein the spatial features comprise data associated with physical distances in images.

14. The method of claim 12, wherein the contextual features comprise data associated with elements surrounding an object image in a frame.

15. The method of claim 1, wherein the object group is stored in a database.

16. The method of claim 1, wherein the object group comprises a plurality of object, images similar to the extracted images.

17. The method of claim 1, wherein the object images comprise images of faces.

18. A method of tracking a specific object through a plurality of frames of a video wherein each frame of the video includes a plurality of objects, comprising the steps of:
    dividing the video into one or more scenes;
    identifying, an image of the specific object in a first frame of one of the one or more scenes;
    assigning the image of the specific object from the first frame of the respective scene to an object group;
    analyzing a subsequent frame of the respective scene to identify a potential additional image of the specific object;

calculating a similarity value between the image of the specific object from the first frame and the potential additional image of the specific object from the subsequent frame;

if the calculated similarity value exceeds a predetermined similarity threshold, assigning the potential additional image to the object group; and repeating the steps of analyzing and calculating for additional subsequent frames of the respective scene whereby the object group has assigned thereto all images of the specific object in the analyzed frames of the video.

19. The method of claim 18, further comprising the step of selecting the specific object, from the plurality of objects in the, first frame of the one or more scenes.

20. The method of claim 18, wherein the step of assigning the image of the specific object to the object group includes associating in a database the image with the frame from which the image was identified.

21. The method of claim 18, wherein the subsequent frame is a frame immediately following the first frame.

22. The method of claim 18, wherein there is at least one interposing frame between the first frame and the subsequent frame.

23. The method of claim 18, wherein the step of calculating a similarity value comprises comparing object features of the image of the specific object from the first frame and the potential additional image of the specific object from the subsequent frame.

24. A method for generating an object model from one or more images in a video, comprising the steps of:

receiving a video file, wherein the video file comprises a plurality of video frames;

detecting an object image from one of the plurality of video frames;

if the detected object image is an optimal object image, extracting a plurality of object features from the optimal object image;

determining whether an object model already exists for the object represented by the optimal object image;

if an object model does not exist for the object, generating an object model comprising the plurality of object features extracted from the optimal object image; and updating the object model with additional object features extracted from one or more additional optimal object images associated with the object extracted from one or more additional video files.

25. The method of claim 24, further comprising the step of if an object model already exists for the object, adding the plurality of object features extracted from the optimal object image to the already-existing object model.

26. The method of claim 24, farther comprising the step of determining that the detected object image is an optimal object image based on properties of the image.

27. The method of claim 26, wherein the image properties comprise one or more of resolution, occlusion, brightness, scale, and pose.

28. The method of claim 24, further comprising the step of determining that the detected object image is an optimal object image by calculating a similarity value between the detected object image and learned examples of optimal object images.

29. A system for identifying object images from videos, comprising:

a processor;

a computer program product that includes a computer-readable medium that is usable by the processor, the medium having stored thereon a sequence of instructions that when executed by the processor causes the execution of the steps of:

retrieving a video, wherein the video comprises a plurality of frames;

extracting a plurality of object images from the plurality of frames;

grouping similar object images together into a group based on a similarity score calculated between features in the plurality of object images;

calculating an average similarity score for the plurality of object images in the group as compared to one or more stored object models, where each object model is associated with a respective object identifier;

if the calculated average similarity score does not exceed a predetermined threshold, labeling the plurality of object images in the group as unknown; and if the calculated average similarity score exceeds the predefined threshold, identifying the plurality of object images in the group based on the respective object identifier of the most similar stored object model.

30. The system of claim 29, further comprising a database for storing one or more videos and the one or more object models.

31. The system of claim 29, wherein the average similarity score is calculated by comparing object features of the plurality of object images to object features of the one or more stored object models.

* * * * *